Nov. 9, 1965    N. A. EDDY III    3,216,432
PORTABLE SCREENING APPARATUS
Filed April 8, 1963    2 Sheets-Sheet 1
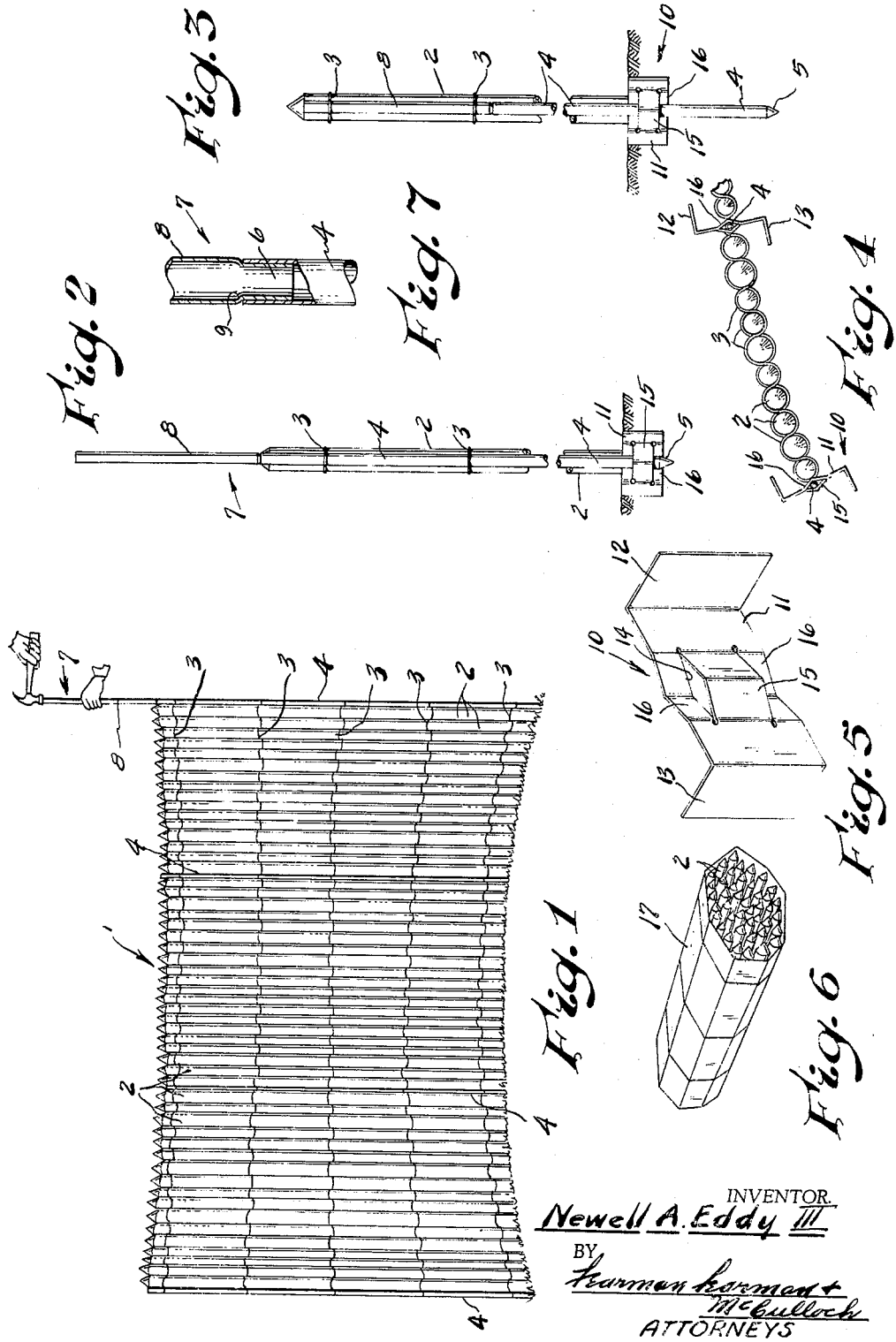

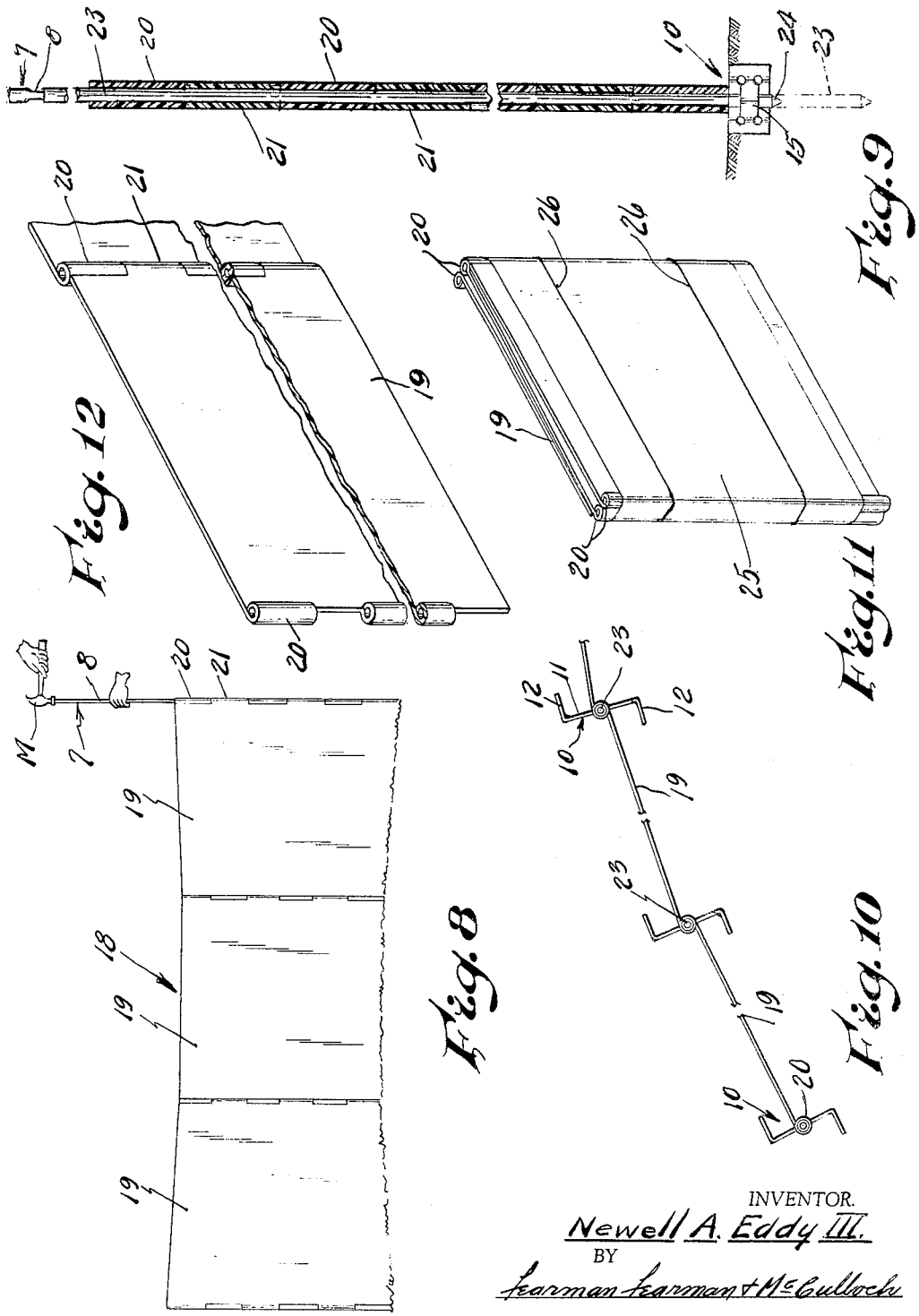

3,216,432
PORTABLE SCREENING APPARATUS
Newell A. Eddy III, Bay City, Mich., assignor to Habitant Fence, Inc., Bay City, Mich., a corporation of Michigan
Filed Apr. 8, 1963, Ser. No. 271,391
3 Claims. (Cl. 135—5)

This invention relates to portable screening apparatus and more particularly to a screen formed of a plurality of side by side, elongated wood or the like palings adapted to be erected in any desired location and capable of being removed quickly and easily when desired.

There are many instances when a portable screen is desirable. For example, there are many occasions when a windback or sun shade of a temporary nature is desirable such as in outdoor barbeque or dining areas. Moreover, the need of an outdoor privacy screen often is felt, but in many residential areas zoning regulations prohibit the erection of permanent fences or screens. Apart from zoning regulations, the erection of a permanent fence or screen often gives rise to unpleasant relations between neighbors, even though a particular fence or screen may be quite attractive in appearance.

There are many uses of portable screens in addition to the uses mentioned above. For example, screens of relatively low height may be utilized as temporary play pens for children, as part of the overall landscaping in lawn and garden areas, and even used indoors as removable wall paneling or room dividers.

An object of this invention is to provide a screen that is portable in the sense that it may be erected in any one of a number of different locations and then removed when desired.

Another object of the invention is to provide a screen which can be formed of a number of palings or pickets connected one to another by flexible means so as thereby to permit the screen, when erected, to assume a desired configuration and to permit it to be rolled into a compact unit for storage or transport.

A further object of the invention is to provide a screen of the kind described which is provided with self-contained supporting means capable of maintaining the screen in erected position.

Another object of the invention is to provide a screen which is usable in conjunction with other, similar screens to provide a screen having any desired length or configuration.

Other objects and advantages of the invention will be referred to specifically or will become apparent from the following description when it is considered in conjunction with the appended claims and the accompanying drawing, in which:

FIGURE 1 is an elevational view of a screen constructed and erected in accordance with the invention;

FIGURE 2 is a fragmentary, end elevation of the screen shown in FIGURE 1 and illustrating the screen in one stage of erection;

FIGURE 3 is a view similar to FIGURE 2, but illustrating the screen in another stage of erection;

FIGURE 4 is a fragmentary, top plan view of the erected screen;

FIGURE 5 is a perspective view of an anchor member forming part of the invention;

FIGURE 6 is a perspective view on a reduced scale of the screen conditioned for shipment or storage;

FIGURE 7 is a fragmentary, enlarged, partly sectional view of a detail of the apparatus;

FIGURE 8 is an elevational view of a modified screen construction;

FIGURE 9 is a vertical, sectional view through one of the hinge joints of the screen shown in FIGURE 8 of the drawings, the broken lines showing the hinge rod driven into the ground;

FIGURE 10 is a fragmentary, top plan view of the erected screen;

FIGURE 11 is a perspective view of the screen folded for shipment or storage;

FIGURE 12 is an enlarged, perspective, fragmentary view of one of the screen sections.

A screen device constructed in accordance with FIGURES 1 to 7 of the invention is designated generally by the reference character 1 and comprises a plurality of substantially uniform length and thickness pickets, saplings, or palings 2 arranged side by side and flexibly connected one to another at intervals along their lengths by connecting wires 3. The connecting wires may be applied to the members 2 in the manner disclosed in Patent No. 2,990,857, issued July 4, 1961, or in any other suitable manner. At intervals along the length of the screen 1 and at each end of the latter is an elongated, tubular, support member or rod 4 that preferably is formed of metal. Preferably, the members 4 are retained in the screen as part of the latter by the same tie wires 3 that connect the members 2 to one another, and each member 4 preferably is formed as a cylinder over the major portion of its length so as to permit it to be slideable relatively to the screen members 2. The lower end of each support member 4, however, preferably is pointed as at 5 so as to facilitate its being driven into the ground.

As is indicated in FIGURE 7, the upper end of each support member 4 preferably is open and is of such size as to receive the reduced terminal end 6 of a driving tube 7 having a main body portion 8 of greater diameter than the diameter of the terminal end portion 6. Between the portions 6 and 8 is formed a shoulder 9 which may bear against the upper end of a support member 4 when the reduced end portion of the driving member 7 is inserted in the member 4.

Means indicated by the reference character 10 is provided for anchoring the support members 4 in screen supporting position. Each anchor member 10 is formed of sheet metal or any other suitable material and comprises a central web portion 11 terminating at one end in a laterally extending flange 12 and at its other end in a laterally extending flange 13. The flanges 12 and 13 preferably extend in opposite directions from the web portion 11 so as to enable the member 11 to be supported on edge and have lateral stability. The web portion is provided with a pair of parallel, longitudinally extending slots 14. The slots 14 form a central band 15 that is flanked on opposite sides by straps 16. The band 15 is bent in one direction out of the plane of the web 11 and the straps 16 are bent in the opposite direction out of the plane of the web 11. The extent to which the members 15 and 16 are laterally bent is sufficient to permit a support rod 4 to pass therebetween and be engaged frictionally by the members 15 and 16.

The flexibility of the wires 3 that interconnect the screen members 2 and the support members 4 enable the screen to be rolled upon itself as is indicated in FIGURE 6 for storage or shipment. If desired, the screen may be covered by a flexible, substantially cylindrical cover member 17 that removably may be maintained in position around a rolled screen by means of wires or cords 18.

To condition the screen for use, it is removed from the cover 17 and arranged in an erect position with the pointed ends 5 of the support members 4 lowermost. For maximum stability, the screen may be arranged along the arc of a circle, as is indicated in FIGURE 1 or, alternatively, the screen could be arranged in such manner that it forms a right angular, U-shaped, serpentine, or any other suitably shaped enclosure, as is permitted by the flexibility of the means that interconnect the screen members 2 and the support members 4. When the screen has been arranged in the desired position outdoors, the anchor members 10 are embedded in the ground as indicated in FIGURES 2, 3, 9, and 10, in predetermined position, with the ends 6 of the rods 5 leading into the slots 14. The driving member 7 is then inserted in the upper end of a support member 4 and the latter driven into the ground, by means of a hammer or mallet M, a distance sufficient to enable the screen to be supported in its upright position.

When the screen 1 has served its purpose, the supporting rods 4 may be withdrawn from the ground or from the anchor members 10 and the screen rolled upon itself for storage. The anchor members 10 may be removed from the ground or, if desired, permitted to remain in the ground for subsequent erection of the screen.

In FIGURES 8 to 12 of the drawings, I have shown a slightly different design in which the palings and wire connecting means are eliminated. The screen 18 is made up of sheets of plastic 19 or the sheet can be formed of plastic, metal, wood, or any other material. In this construction, the end sections of each sheet are provided with a plurality of spaced apart tubular members 20 provided on the ends of the sheets, and so arranged, that each single tubular end section 21 is interposed between a spaced apart pair of tubular end sections on the end of the next adjacent sheet. These cylindrical end sections are formed with a vertically disposed bore, adapted when in assembled relation, to accommodate a hinge rod 23, thus forming a commercially termed piano hinge at each end of the sheet, and while in the present instance I have shown the members 19 of certain height, it will, of course, be understood that the sheets can be of greater width, or that each section can be formed of a plurality of individual strips if desired.

The anchor 10 is used in exactly the same manner as described in connection with the palings, it is entered in the ground when the screen is being erected, and the pointed end 24 of the hinge rod 23 is entered in the opening 14 of the anchor 10 so that the upper end is slightly below the upper end of the hinge, the same as shown in FIGURE 2 of the drawings. The short section of rod 7 is then placed on the upper end of rod 23 and driven, by means of a hammer or other instrument M, to drive the pin deeper into the ground, all as indicated in broken lines in FIGURE 9 of the drawings.

While in the instant described construction I have shown the sheets 19 formed of plastic, it will be understood that they can be of wood, metal, or any other suitable material. The sections 18 can be readily folded for shipment by merely folding the hingedly connected sections one on the other, or the sections can be disconnected and disassembled into individual strips. In FIGURE 11 of the drawings, I have shown the screen folded and covered by cardboard 25 with cords 26 to secure the cardboard in position.

Screens constructed in accordance with the invention may be supplied in different lengths or in uniform lengths. In any event, two or more screens may be arranged end to end so as to form a screen having any desired length and arranged in any desired form.

The disclosed embodiment is representative of a presently preferred form of the invention, but it is intended to be illustrative rather than definitive thereof. The invention is defined in the claims.

I claim:
1. Portable screening means anchored in the ground comprising: a plurality of vertically disposed, foldable fence sections, connected to support stakes of generally the height of the fence sections, and disposed in an unfolded, generally longitudinally extending relation; anchor plate means for said fence sections formed with elongate web portions extending generally transversely of said fence sections and received in the ground; said web portions having terminal ends bent generally perpendicularly to the transversely extending web sections to extend generally parallel to the longitudinal extent of said unfolded fence sections; and socket means on said anchor plate means receiving said stakes.

2. The combination defined in claim 1 in which the terminal ends on the web portions extend in opposite directions.

3. The combination defined in claim 1 in which said fence sections comprise pickets wired in side-by-side relation.

References Cited by the Examiner
UNITED STATES PATENTS

| | | | |
|---|---|---|---|
| 64,062 | 4/67 | Binner | 160—231 |
| 69,444 | 10/67 | Johnson | 256—1 |
| 80,657 | 8/68 | Norman | 160—231 |
| 141,750 | 8/73 | Becher | 160—135 |
| 1,456,519 | 5/23 | Semenoff et al. | 256—24 |
| 1,748,878 | 2/30 | Hahn | 189—90 |
| 2,803,437 | 8/57 | Borges | 256—12.5 |
| 3,132,726 | 5/64 | Johnson | 189—29 |

HARRISON R. MOSELEY, *Primary Examiner.*